United States Patent
Cha

(10) Patent No.: US 8,175,658 B2
(45) Date of Patent: May 8, 2012

(54) POWER APPARATUS, WIRELESS COMMUNICATION APPARATUS HAVING THE SAME, AND POWER SUPPLYING METHOD THEREOF

(75) Inventor: Jae-deok Cha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 874 days.

(21) Appl. No.: 12/145,731

(22) Filed: Jun. 25, 2008

(65) Prior Publication Data
US 2009/0029660 A1    Jan. 29, 2009

(30) Foreign Application Priority Data

Jul. 27, 2007 (KR) .................... 10-2007-0075833

(51) Int. Cl.
*H04B 1/38* (2006.01)
(52) U.S. Cl. .......... 455/571; 455/572; 455/550.1; 455/127.1; 455/127.5; 323/222; 323/224; 323/225
(58) Field of Classification Search .......... 455/571, 455/572, 550.1, 127.1, 127.5; 323/222, 224, 323/225
See application file for complete search history.

(56) References Cited

U.S. PATENT DOCUMENTS

| 4,692,851 | A  | * | 9/1987  | Attwood ................. 363/16    |
| 5,923,152 | A  | * | 7/1999  | Guerrera ................ 323/222  |
| 6,178,104 | B1 |   | 1/2001  | Choi                                |
| 6,232,752 | B1 |   | 5/2001  | Bissell                             |
| 7,403,400 | B2 | * | 7/2008  | Stanley .................. 363/16   |
| 7,471,155 | B1 | * | 12/2008 | Levesque ............... 330/297    |
| 7,616,459 | B2 | * | 11/2009 | Huynh et al. ........... 363/21.12  |

FOREIGN PATENT DOCUMENTS

KR    10-0286047 B1    1/2001

* cited by examiner

*Primary Examiner* — Sanh Phu
(74) *Attorney, Agent, or Firm* — Jefferson IP Law, LLP

(57) ABSTRACT

A wireless communication apparatus includes: a wireless communication unit which performs wireless communication; a converter which converts an input voltage into an output voltage in a switched-mode to supply the output voltage to the wireless communication unit; and a frequency adjusting unit which adjusts a frequency of a high frequency noise caused by a parasitic component of the converter, if the converter is switched, to prevent the frequency of the high frequency noise from interfering with a frequency of the wireless communication performed by the wireless communication unit.

22 Claims, 10 Drawing Sheets

POWER APPARATUS, WIRELESS COMMUNICATION APPARATUS HAVING THE SAME, AND POWER SUPPLYING METHOD THEREOF

CROSS-REFERENCE TO RELATED APPLICATION

This application claims the benefit of Korean Application No. 2007-75833, filed Jul. 27, 2007, in the Korean Intellectual Property Office, the disclosure of which is incorporated herein by reference.

BACKGROUND OF THE INVENTION

1. Field of the Invention

Aspects of the present invention relate to a power apparatus, a wireless communication apparatus having the same, and a power supplying method thereof, and more particularly, to a power apparatus, a wireless communication apparatus having the same, and a power supplying method thereof, which supplies power to the wireless communication apparatus in a switched mode.

2. Description of the Related Art

A wireless communication apparatus, such as a laptop computer and/or a mobile phone, performs wireless communication, such as digital multimedia broadcasting (DMB), high speed downlink packet access (HSDPA), and wireless broadband internet (WiBro) communication, to provide various functions. The wireless communication apparatus may include a switched-mode power apparatus, which is more efficient than a linear mode power apparatus, to receive operating power. FIG. 1 is a circuit diagram of a synchronous buck converter 1 as an example of a typical switched-mode power apparatus.

As shown therein, the synchronous buck converter 1 includes a control field-effect transistor (CFET) and a synchronous field-effect transistor (SFET) as paired switching elements, a filter inductor $L_F$, and a filter capacitor $C_F$. The synchronous buck converter 1 converts an input voltage $V_{DC}$ into an output voltage $V_{OUT}$. In the switched-mode power apparatus of FIG. 1, the CFET and the SFET are alternately turned on and off according to a PWM (pulse width modulation) control signal with a predetermined dead time, which cause high frequency noises such as high frequency oscillation of a phase voltage $V_{PHASE}$.

FIG. 2 illustrates a waveform of the high frequency noise. As shown therein, reference numerals 2 and 3 refer to PWM control signals which are respectively inputted to the CFET and the SFET. The reference numeral 4 is the phase voltage $V_{PHASE}$ applied across the SFET, while the reference numerals 5 and 6 respectively refer to the high frequency noise at a rising edge and a falling edge of the phase voltage $V_{PHASE}$.

If the frequency of the high frequency noise is close to a frequency of a wireless communication signal of the wireless communication apparatus, the reception sensitivity of the wireless communication and/or the wireless communication apparatus is lowered due to interference between the high frequency noise and the wireless communication signal, to thereby deteriorate the quality of the wireless communication using the wireless communication signal.

SUMMARY OF THE INVENTION

Accordingly, it is an aspect of the present invention to provide a power apparatus, a wireless communication apparatus having the same, and a power supplying method thereof, which minimizes deterioration of wireless communication quality while power is supplied to the wireless communication apparatus.

Additional aspects of the present invention will be set forth in part in the description which follows and, in part, will be obvious from the description, or may be learned by practice of the present invention.

The foregoing and/or other aspects of the present invention are also achieved by providing a wireless communication apparatus including: a wireless communication unit which performs wireless communication; a converter which converts an input voltage into an output voltage in a switched-mode to supply the output voltage to the wireless communication unit; and a frequency adjusting unit which adjusts a frequency of a high frequency noise caused by a parasitic component of the converter, if the converter is switched, to prevent the frequency of the high frequency noise from interfering with a frequency of the wireless communication performed by the wireless communication unit.

According to an aspect of the present invention, the frequency adjusting unit may include an inductor which has inductance set to prevent and/or reduce the interference between the frequency of the high frequency noise and the frequency of the wireless communication.

According to an aspect of the present invention, the converter may include a pair of field-effect transistors (FETs) which are alternately turned on and off according to a control signal, and the inductor may be provided between an input terminal providing the input voltage and a drain of a control FET of the pair of FETs connected to the input terminal.

According to an aspect of the present invention, the inductance of the inductor may be determined by a following [Formula 1]:

$$fc = \frac{1}{2\pi\sqrt{(L_{STRAY1} + L1)C_{OSS1}}} \qquad [\text{Formula 1}]$$

where, fc is the frequency of the high frequency noise caused by the parasitic component of the converter, L1 is the inductance of the inductor, $L_{STRAY1}$ is a parasitic inductance between the input terminal of the input voltage and the drain of the control FET, and $C_{OSS1}$ is an equivalent capacitance of a synchronous FET of the pair of FETs.

According to an aspect of the present invention, the wireless communication apparatus may further include an amplitude limiter which has a damping factor to decrease an amplitude of the high frequency noise caused by the parasitic component of the converter.

According to an aspect of the present invention, the damping factor may be set so that a peak value of a voltage across a synchronous FET of the pair of FETs does not exceed a rated voltage of the synchronous FET.

According to an aspect of the present invention, the amplitude limiter may include a bootstrap resistor which has a resistance value corresponding to the damping factor.

According to an aspect of the present invention, the converter may further include a driver which drives the control FET according to the control signal, and the bootstrap resistor may be connected with an operating power input terminal of the driver.

According to an aspect of the present invention, the resistance value of the bootstrap resistor may be determined by the following [Formula 2]:

Time constant=the resistance value of the bootstrap resistor*capacitance between a gate and a source of the control FET,   [Formula 2]

where, the time constant is a damping factor in a transient response of a voltage across a synchronous FET of the pair of FETs.

Another aspect of the present invention is to provide a power apparatus of a wireless communication apparatus which performs wireless communication, the power apparatus including: a converter which converts an input voltage into an output voltage in a switched-mode to supply the output voltage to the wireless communication apparatus; and a frequency adjusting unit which adjusts a frequency of a high frequency noise caused by a parasitic component of the converter, if the converter is switched, to prevent and/or reduce the frequency of the high frequency noise from interfering with a frequency of the wireless communication performed by the wireless communication apparatus.

Still another aspect of the present invention is to provide a method for supplying power to a wireless communication apparatus which performs wireless communication, the method including: converting an input voltage into an output voltage in a switched-mode to supply the output voltage to the wireless communication apparatus; and adjusting a frequency of a high frequency noise caused by a parasitic component in the switched-mode of the converting to prevent and/or reduce the frequency of the high frequency noise from interfering with a frequency of the wireless communication performed by the wireless communication apparatus.

According to an aspect of the present invention, the adjustment may include decreasing the frequency of the high frequency noise.

According to an aspect of the present invention, the adjustment may include providing an inductor between an input terminal of the input voltage and a drain of a control FET of a pair of FETs of a converter.

According to an aspect of the present invention, the inductance of the inductor may be determined by the following Formula 1:

$$fc = \frac{1}{2\pi \sqrt{(L_{STRAY1} + L1)C_{OSS1}}} \quad \text{[Formula 1]}$$

where, fc is the frequency of the high frequency noise, L1 is the inductance of the inductor, $L_{STRAY1}$ is a parasitic inductance between the input terminal of the input voltage and the drain of the control FET, and $C_{OSS1}$ is equivalent capacitance of a synchronous FET of the pair of FETs.

According to an aspect of the present invention, the method may further include decreasing an amplitude of the high frequency noise so that a peak value of a voltage across a synchronous FET of a pair of FETs of a converter which performs the converting of the input voltage does not exceed a rated voltage of the synchronous FET.

According to an aspect of the present invention, the frequency of the high frequency noise may be decreased by providing a bootstrap resistor which is connected with an operating power input terminal of a driver which drives a control FET of the pair of FETs connected to the input terminal.

According to an aspect of the present invention, the resistance of the bootstrap resistor may be determined by the following Formula 2:

Time constant=the resistance of the bootstrap resistor*capacitance between a gate and a source of the control FET, [Formula 2]

where, the time constant is a damping factor in a transient response of a voltage across the synchronous FET.

According to an aspect of the present invention, a power supply apparatus of a wireless communication device includes a power converter to convert an input voltage into an output voltage, the power converter including, a first transistor and a second transistor, which are alternatively switched on and off with respect to each other, and an inductor positioned between an input terminal for the input voltage and the first resistor to reduce a frequency of a noise of the power converter that interferes with a frequency of a signal of the wireless communication device; and a signal supplier to provide a pulse width modulation control signal to the first and second transistors to alternatively switch the first and second transistors.

According to an aspect of the present invention, a method of supplying power to a wireless communication apparatus includes converting an input voltage into an output voltage by alternatively switching a first transistor and a second transistor of a power converter to supply the output voltage to the wireless communication apparatus; and increasing an inductance of first parasitic components existing between an input terminal of the input voltage and the first transistor and/or second parasitic components existing between the second transistor and a ground to reduce a frequency of a noise having the frequency and an amplitude created by the first and/or the second parasitic components during switching of the first and second transistors.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which.

DETAILED DESCRIPTION OF THE EMBODIMENT

Figure 1:
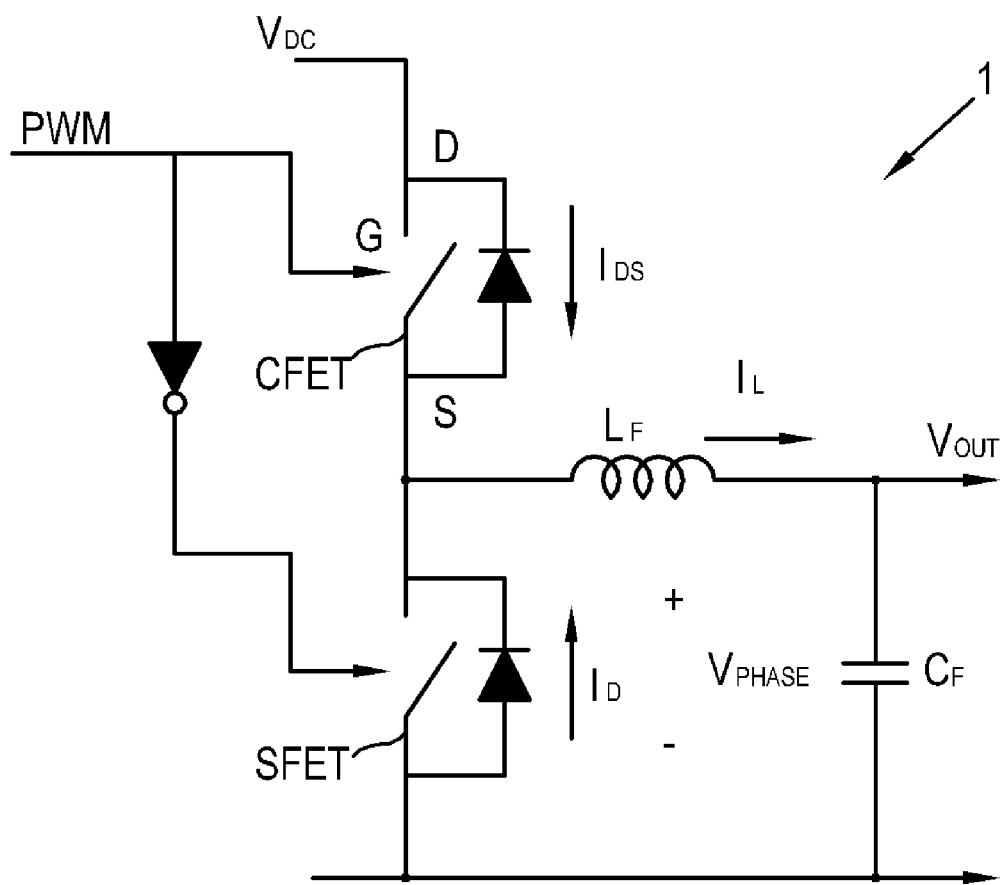
FIG. 1 is a circuit diagram of a synchronous buck converter exemplifying a typical switched-mode power apparatus.

Reference will now be made in detail to aspects of the present invention, examples of which are illustrated in the accompanying drawings, wherein like reference numerals refer to the like elements throughout. The aspects are described below in order to explain the present invention by referring to the figures. In the aspects, repetitive descriptions will be avoided as necessary.

First, a cause of high frequency noise, which is generated by a switched-mode power apparatus and which deteriorates the quality of wireless communication, will be described. A synchronous buck converter 1 in FIG. 1 has two operation modes. One mode is a powering mode in which a control field-effect transistor (CFET) is turned on after a lapse of a dead time if a synchronous field-effect transistor (SFET) is turned off, and in which first mode (or powering mode) currents IDS and IL flow through a filter inductor LF. The other mode is a freewheeling mode in which the SFET is turned on after a lapse of the dead time if the CFET is turned off, and second mode (or freewheeling mode) currents ID and IL flow through the filter inductor LF.

Figure 3:
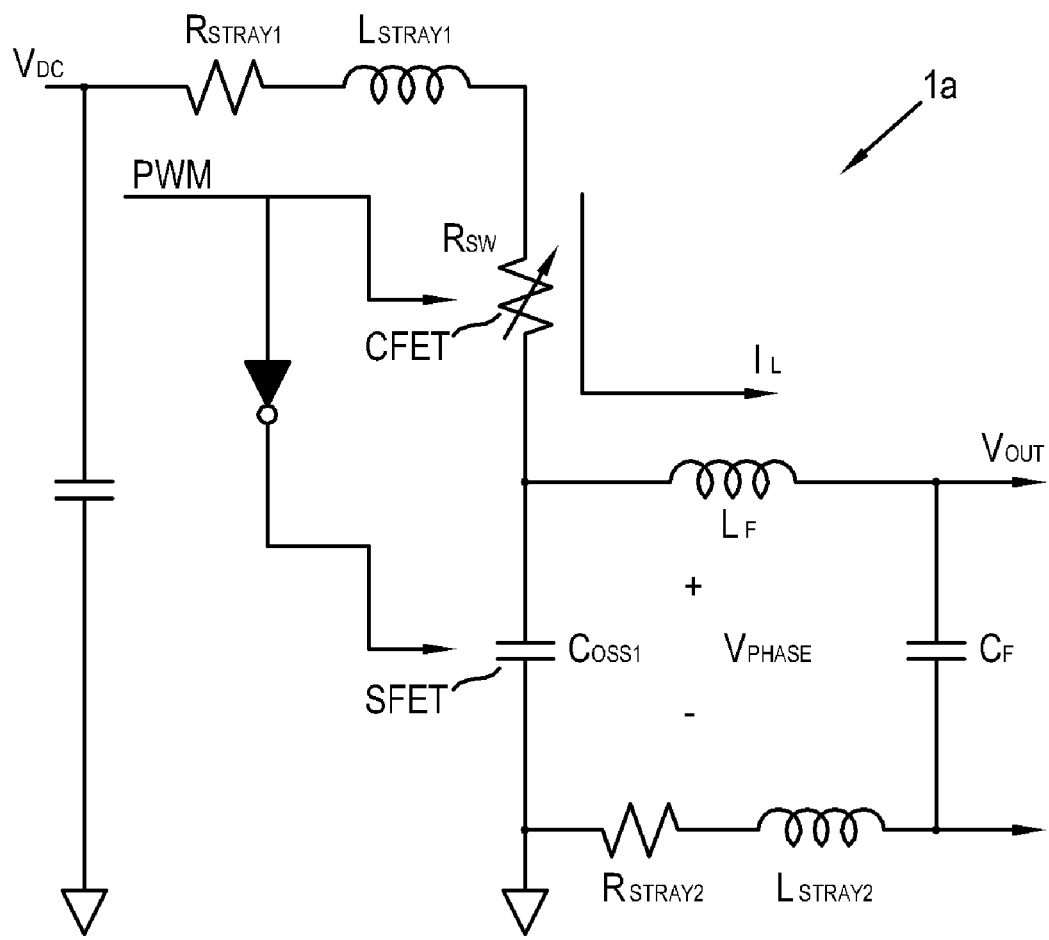
FIGS. 3 and 4 are respective equivalent circuit diagrams of a synchronous buck converter in a powering mode and a freewheeling mode related to an aspect of the present invention.
Figure 4:
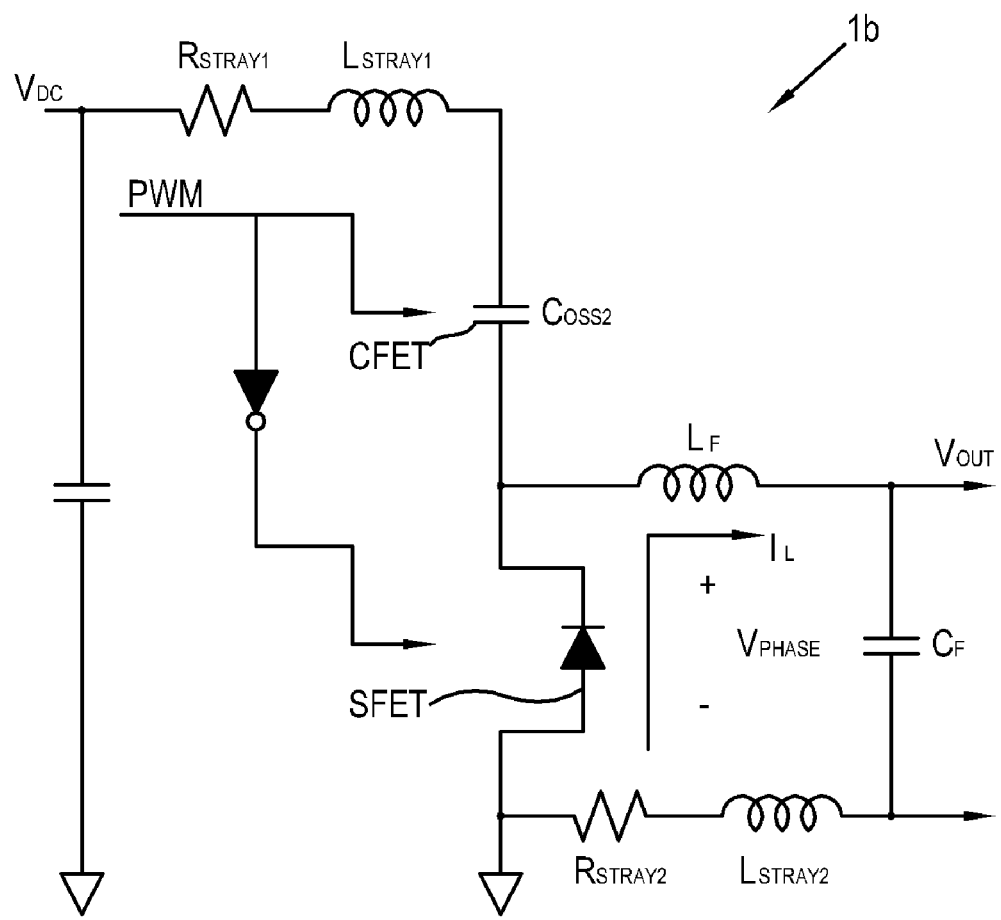

FIGS. 3 and 4 illustrate respective equivalent circuits 1a and 1b of the synchronous buck converter in the powering mode and the freewheeling mode, respectively. As shown in FIG. 3, a first parasitic resistor RSTRAY1 and a first parasitic inductor LSTRAY1 are considered to exist between an input terminal of a first input voltage VDC and a drain D of the CFET during the powering mode of the synchronous buck converter 1. Such parasitic components are determined by shapes, thicknesses, and widths of a pattern and a via hole between the input terminal of the first input voltage VDC and the drain D of the CFET, for example.

If turned on (or switched on), the CFET allows a current (IL) to pass therethrough after a predetermined delay time, due to inherent characteristics thereof. As shown in FIG. 3, the CFET may include a resistant component, which may be represented as a switch resistor RSW. Meanwhile, the SFET may include a capacitance component in the powering mode according to inherent characteristics thereof, which may be represented as a first capacitor COSS1.

A second parasitic resistor RSTRAY2 and a second parasitic inductor LSTRAY2 may exist between a first end of the filter capacitor CF and a ground terminal, in a manner similar to the parasitic components located between the input terminal of the first input voltage VDC and the drain D of the CFET.

Figure 2:
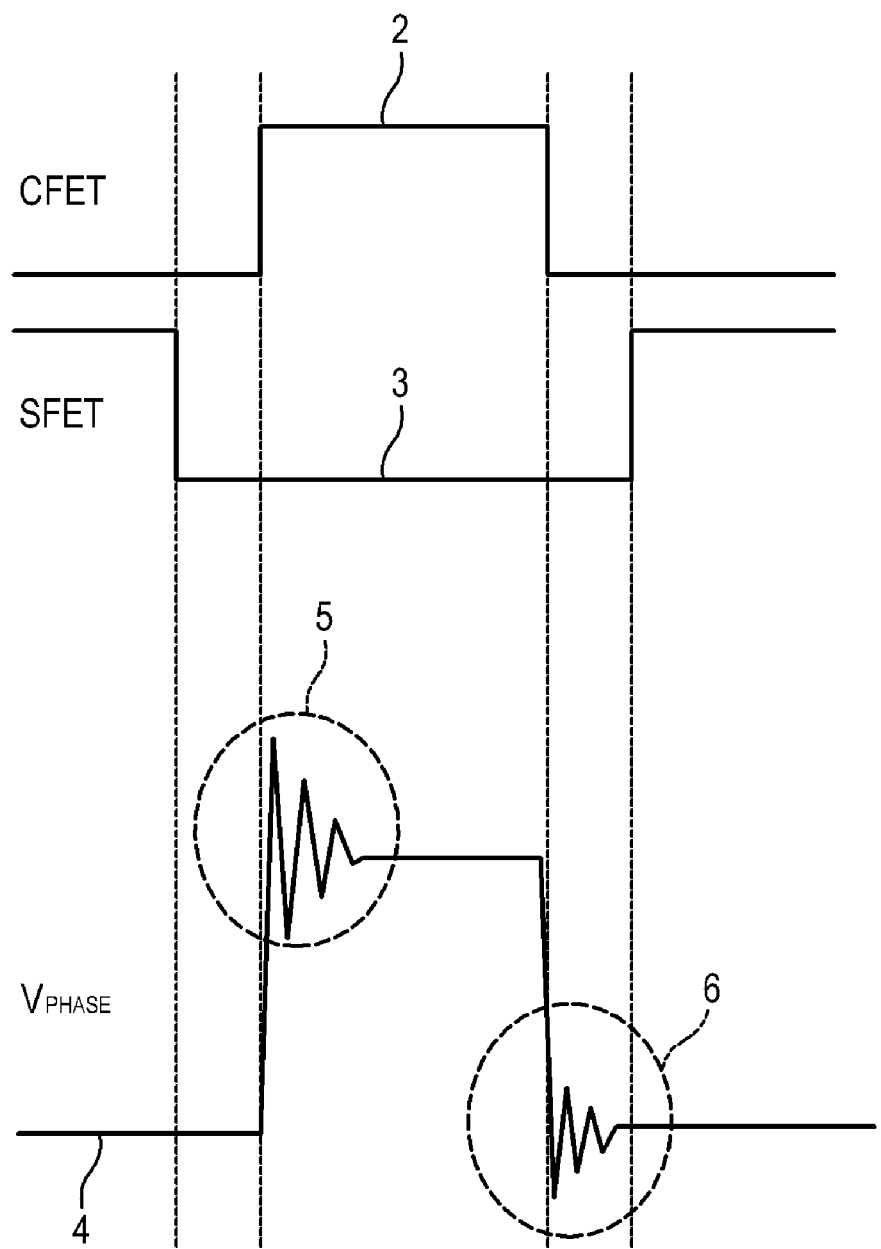
FIG. 2 illustrates a waveform of high frequency noises generated by the synchronous buck converter of FIG. 1.

As shown in FIG. 2, a high frequency noise is caused at a rising edge 5 of the phase voltage VPHASE applied to both ends of the SFET by resonance of the first parasitic resistor RSTRAY1, the switch resistor RSW, the first parasitic inductor LSTRAY1, and the first capacitor COSS1. The frequency and amplitude of the caused high frequency noise are determined by respective values of the first parasitic resistor RSTRAY1, the switch resistor RSW, the first parasitic inductor LSTRAY1 and/or the first capacitor COSS1.

As shown in FIG. 4, the CFET may be represented as a second capacitor COSS2 in the freewheeling mode (since the CFET is switched off). In this case, a high frequency noise is caused at a falling edge 6 of the phase voltage VPHASE applied to both ends of the SFET as is shown in FIG. 2 by resonance of resistant components of the second parasitic resistor RSTRAY2 and the SFET, and/or the inductance of the second parasitic inductor LSTRAY2. In various aspects of the present invention, parasitic components may refer to the first parasitic resistor RSTRAY1, the switch resistor RSW, the first parasitic inductor LSTRAY1, the first capacitor COSS1, the second parasitic resistor RSTRAY2, the SFET, and/or the second parasitic inductor LSTRAY2, for example.

If an interference between a frequency of the high frequency noise caused by the parasitic components and a frequency of a wireless communication signal is anticipated (or likely), aspects of the present invention controls (or compensates for effects of) the parasitic components, and adjusts the frequency of the high frequency noise so as to not affect (or lessen the effect of) the frequency of the wireless communication signal, to thereby improve the quality of the wireless communication.

Figure 5:
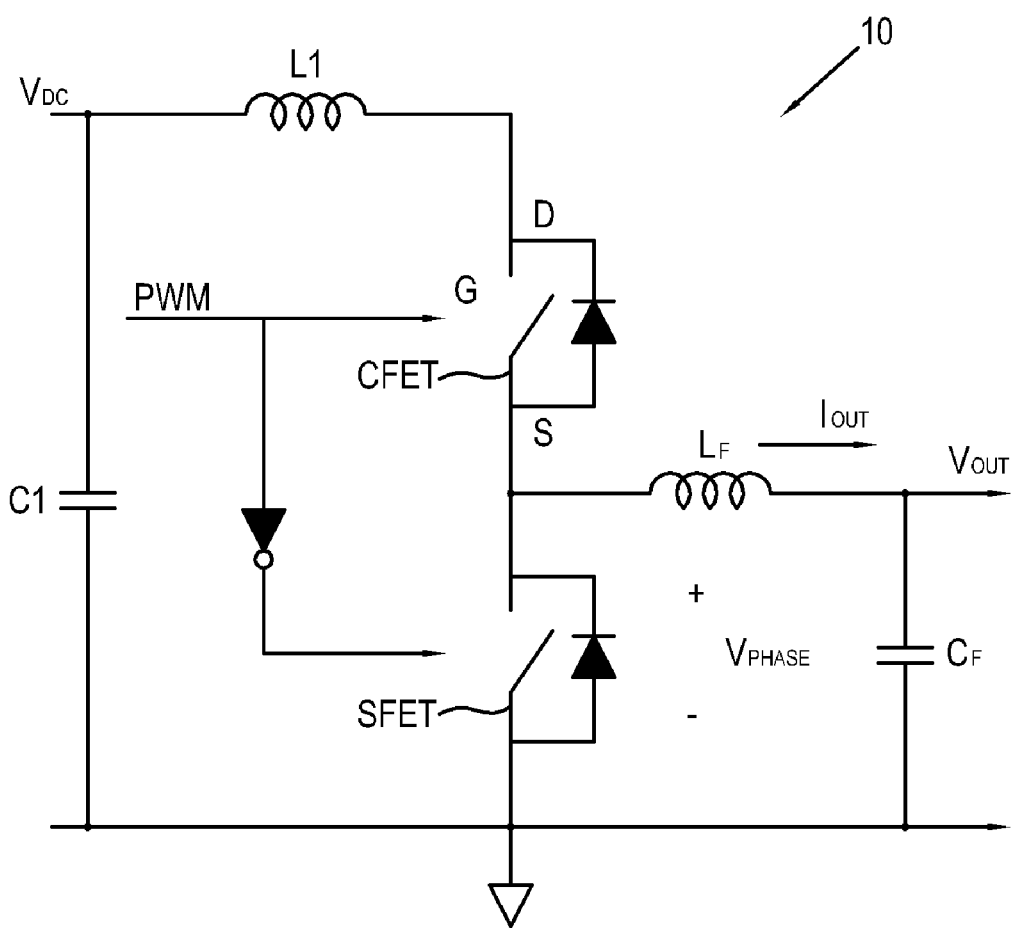
FIG. 5 is a circuit diagram of a synchronous buck converter according to an aspect of the present invention.

Hereinafter, a power apparatus, and a wireless communication apparatus having the same according to an aspect of the present invention will be described. FIG. 5 is a circuit diagram of a synchronous buck converter 10 according to an aspect of the present invention. The synchronous buck converter 10 supplies operating power to a wireless communication apparatus, such as a laptop computer and/or a mobile phone, to perform wireless communication, including digital multimedia broadcasting (DMB), high speed downlink packet access (HSDPA), and wireless broadband internet (WiBro) communication. The synchronous buck converter 10 may be provided within the wireless communication apparatus or be provided separate from the wireless communication apparatus as an additional apparatus. The synchronous buck converter 10 is an example of a converter of the power apparatus or the wireless communication apparatus according to aspects of the present invention.

The synchronous buck converter 10 converts the first input voltage VDC into an output voltage VOUT, i.e., an operating power (or a voltage) of the wireless communication apparatus. The wireless communication apparatus includes a wireless communication unit (not shown) to perform wireless communication.

As shown in FIG. 5, the synchronous buck converter 10 includes a control field-effect transistor (CFET), a synchronous field-effect transistor (SFET), a filter inductor LF, and a filter capacitor CF. The CFET and the SFET are alternately turned on and off with a predetermined dead time according to a PWM (pulse width modulation) control signal.

The synchronous buck converter 10 further includes a frequency adjusting inductor L1, which adjusts a frequency of a high frequency noise caused by parasitic components (shown in FIGS. 3 and 4). The frequency adjusting inductor L1 is an example of a frequency adjusting unit according to an aspect of the present invention. The frequency of the high frequency noise at a rising edge of a phase voltage VPHASE across the SFET caused by the parasitic components may be adjusted by the frequency adjusting inductor L1. In this case, the frequency fc of the high frequency noise caused by the parasitic components is determined by the following Formula 1.

$$fc = \frac{1}{2\pi\sqrt{(L_{STRAY1} + L1)C_{OSS1}}} \quad \text{[Formula 1]}$$

Here, L1 is an inductance of the frequency adjusting inductor L1, LSTRAY1 is a parasitic inductance between an input terminal of the first input voltage $V_{DC}$ and the drain D of the CFET, and $C_{OSS1}$ is a capacitance of the SFET in the powering mode (refer to $L_{STRAY1}$ and $C_{OSS1}$ in FIG. 3).

According to Formula 1, the added frequency adjusting inductor L1 reduces the frequency of the high frequency noise caused by the parasitic components, in comparison to when the frequency adjusting inductor L1 is absent. If the interference between the frequency of the high frequency noise and the frequency of the wireless communication is anticipated, the inductance of the frequency adjusting inductor L1 is determined (or set) to avoid the frequency interference, to thereby improve the reception quality of the wireless communication.

For example, if the DMB reception frequency band ranges approximately 180 MHz to 210 MHz, and if the frequency of the high frequency noise of the synchronous buck converter 10 due to the parasitic components is about 225 MHz, the frequency interference may occur therebetween. In this case, the inductance of the frequency adjusting inductor L1 is properly determined (or set) so that the frequency of the high frequency noise is reduced to approximately 112 MHz, for example, to thereby avoid or reduce the frequency interference therebetween.

Figure 6:
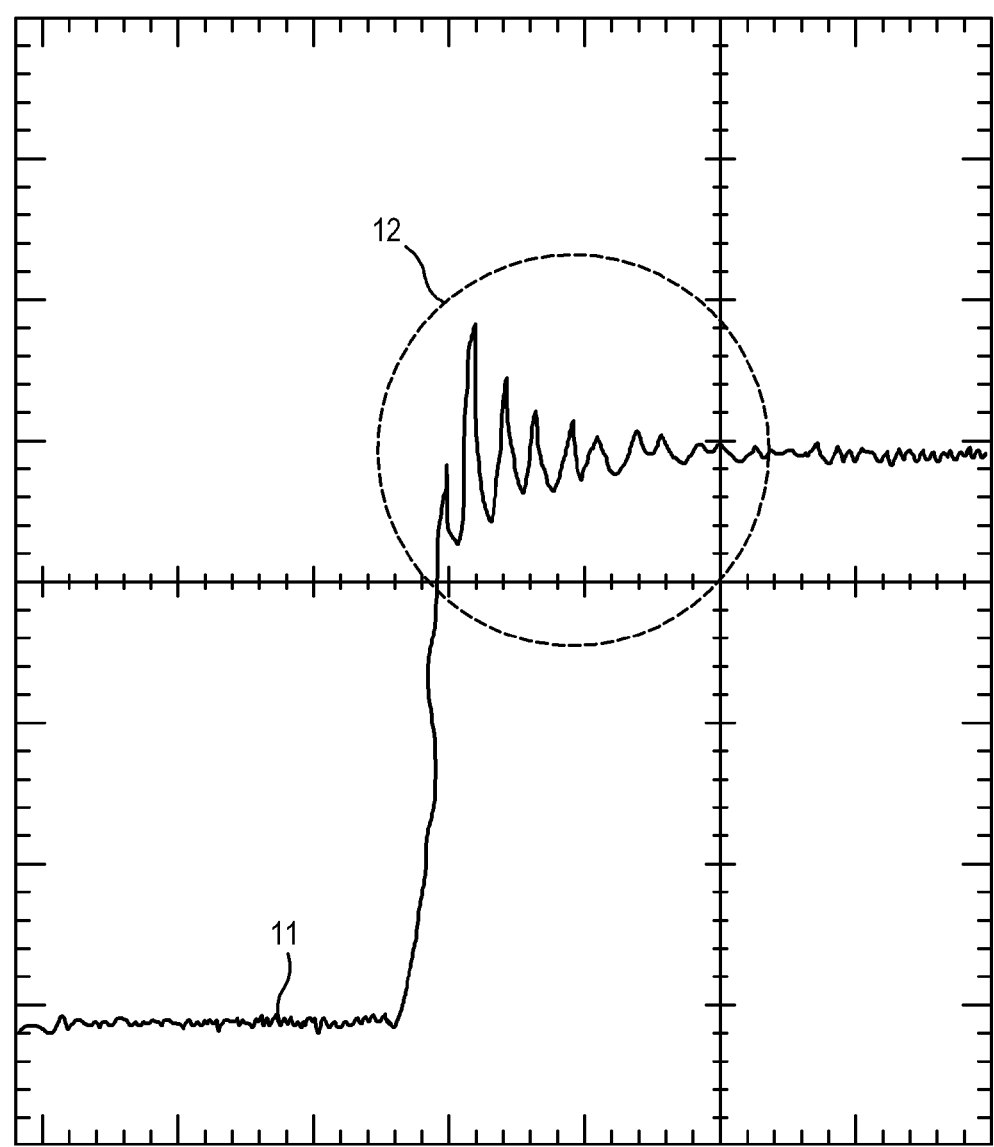
FIGS. 6 and 7 respectively illustrate waveforms of phase voltages applied across a synchronous FET according to FIGS. 3 and 4, and FIG. 5.
Figure 7:
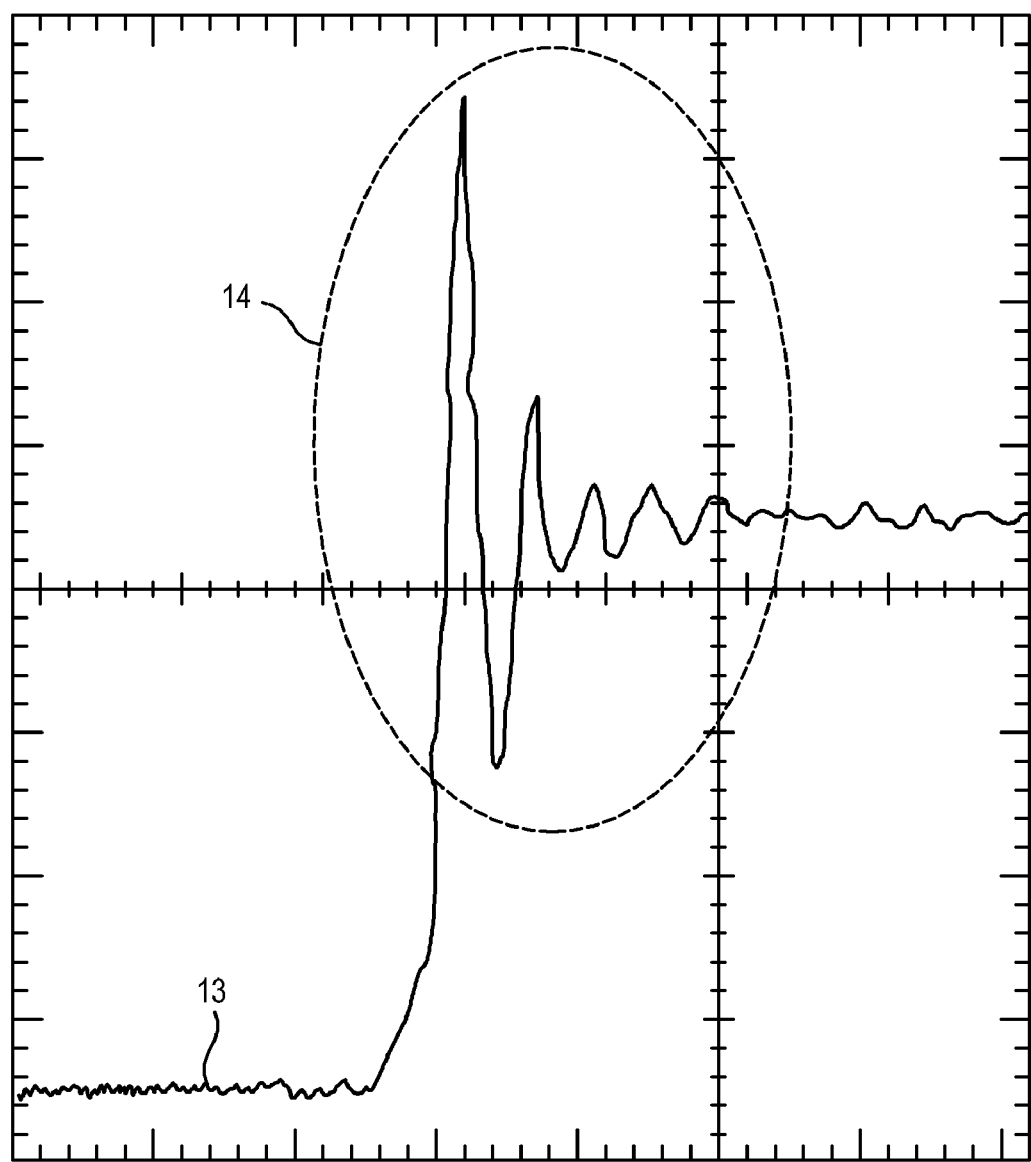

FIGS. 6 and 7 illustrate respective waveforms 11 and 13 of the phase voltage $V_{PHASE}$ across the SFET. Specifically, FIG. 6 illustrates a waveform of the phase voltage $V_{PHASE}$ if the frequency adjusting inductor L1 is not present, while FIG. 7 illustrates a waveform of the phase voltage $V_{PHASE}$ if the frequency adjusting inductor L1 is present. As shown therein, compared to the frequency of the high frequency noise at a rising edge 12 in FIG. 6, the frequency of the high frequency noise at a rising edge 14 in FIG. 7 is reduced.

Hereinafter, a power apparatus and a wireless communication apparatus having the same according to another aspect of the present invention will be described. In FIGS. 6 and 7, while the frequency of the high frequency noise is markedly reduced at the rising edge 14 in FIG. 7 than at the rising edge 12 in FIG. 6, the amplitude of the waveform is increased at the rising edge 14 in FIG. 7 than at the rising edge 12 in FIG. 6. Accordingly, if the amplitude of the high frequency noise increases, it is necessary to consider a new factor in designing the synchronous buck converter 10 to offset the increased amplitude of the waveform. For example, a peak value of the phase voltage $V_{PHASE}$ across the SFET should not exceed an upper limit of a rated voltage of the SFET so as to protect the SFET from harm.

According to an aspect of the present invention, resistant components, i.e., a damping factor is used to counteract the increase in the resonance due to the parasitic components to reduce the amplitude of the high frequency noise. Thus, the peak value of the phase voltage $V_{PHASE}$ across the SFET does not exceed the upper limit of the rated voltage of the SFET.

Figure 8:
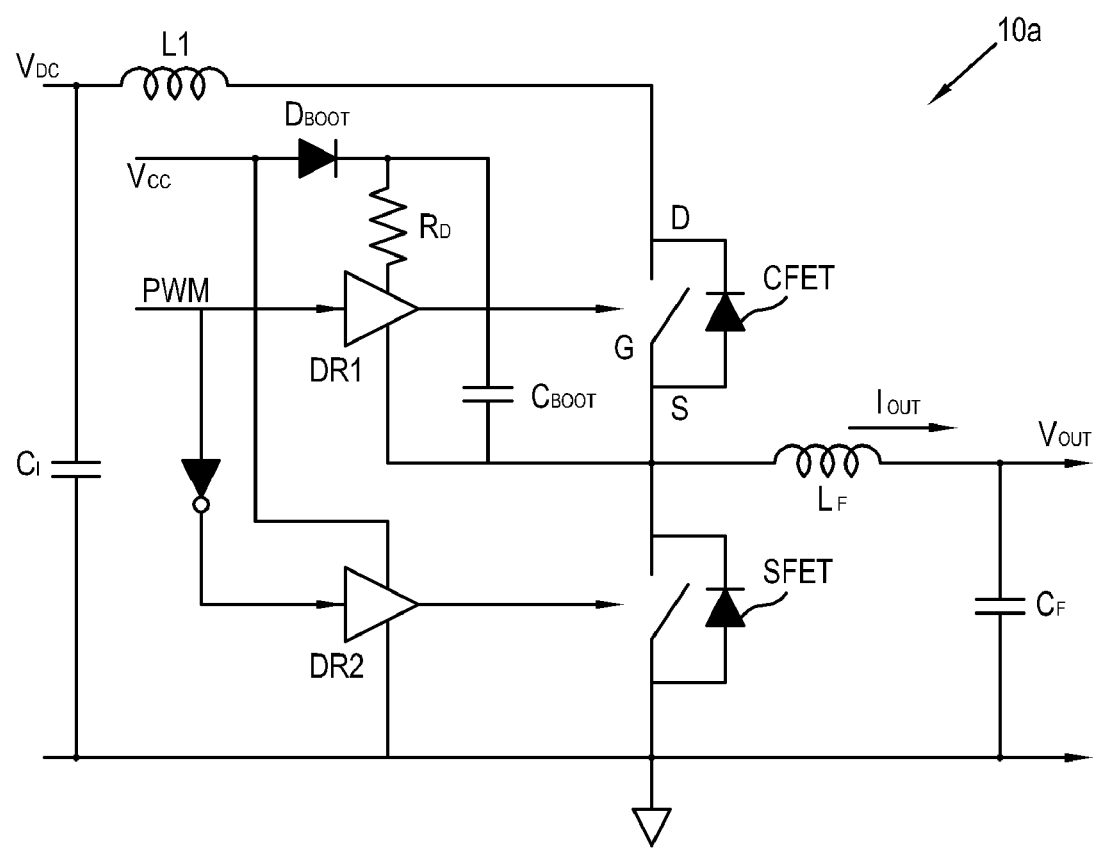
FIG. 8 is a circuit diagram of a synchronous buck converter according to another aspect of the present invention.

FIG. 8 is a circuit diagram of a synchronous buck converter 10a according to another aspect of the present invention. The synchronous buck converter 10a further includes a first driver DR1, a second driver DR2, a third capacitor $C_{BOOT}$, a diode $D_{BOOT}$, and a bootstrap resistor $R_D$. The bootstrap resistor $R_D$ is an example of an amplitude limiter according to an aspect of the present invention.

The first and second drivers DR1 and DR2 are push-pull types and respectively drive the CFET and the SFET based on a PWM control signal. The third capacitor $C_{BOOT}$ supplies power to operate the first driver DR1. The third capacitor $C_{BOOT}$ is charged by a second input voltage $V_{CC}$ if the CFET is turned off and if the SFET is turned on. The diode $D_{BOOT}$ protects the second input voltage $V_{CC}$ against the first input voltage $V_{DC}$ if the CFET is turned on and the SFET is turned off.

In a powering mode, the bootstrap resistor $R_D$ delays a turn-on timing of the CFET and increases a damping factor in a resonance of one or more parasitic components. The bootstrap resistor $R_D$ is provided between the third capacitor $C_{BOOT}$ and an operating power input terminal of the first driver DR1.

In the powering mode, a capacitance component exists between a gate G and a source S of the CFET. The capacitance component causes RC resonance together with the bootstrap resistor $R_D$ in the powering mode to delay the turn-on timing of the CFET, which can be seen as an increase in the resistant component of the CFET during the powering mode (in reference to $R_{SW}$ in FIG. 3). As the resistant component in the resonance of the parasitic components makes an oscillation of the waveform to converge (or attenuate), the bootstrap resistor $R_D$ decreases the amplitude of the high frequency noise caused by the parasitic components as a result.

The resistance value of the bootstrap resistor $R_D$ is appropriately determined (or set) so as to decrease the amplitude of the high frequency noise. Thus, the peak value of the phase voltage $V_{PHASE}$ across the SFET does not exceed the upper limit of the rated voltage of the SFET. In this case, the resistance value of the bootstrap resistor $R_D$ may be determined (or set) in consideration of a time constant of a circuit as a damping factor of the high frequency noise amplitude of the circuit. The waveform of the phase voltage $V_{PHASE}$ in a transient response decreases exponentially corresponding to the time constant of the circuit. The time constant is represented by the following formula 2.

Time constant=resistance value of bootstrap resistor $R_D$*capacitance between gate G and source S of the CFET. [Formula 2]

Figure 9:
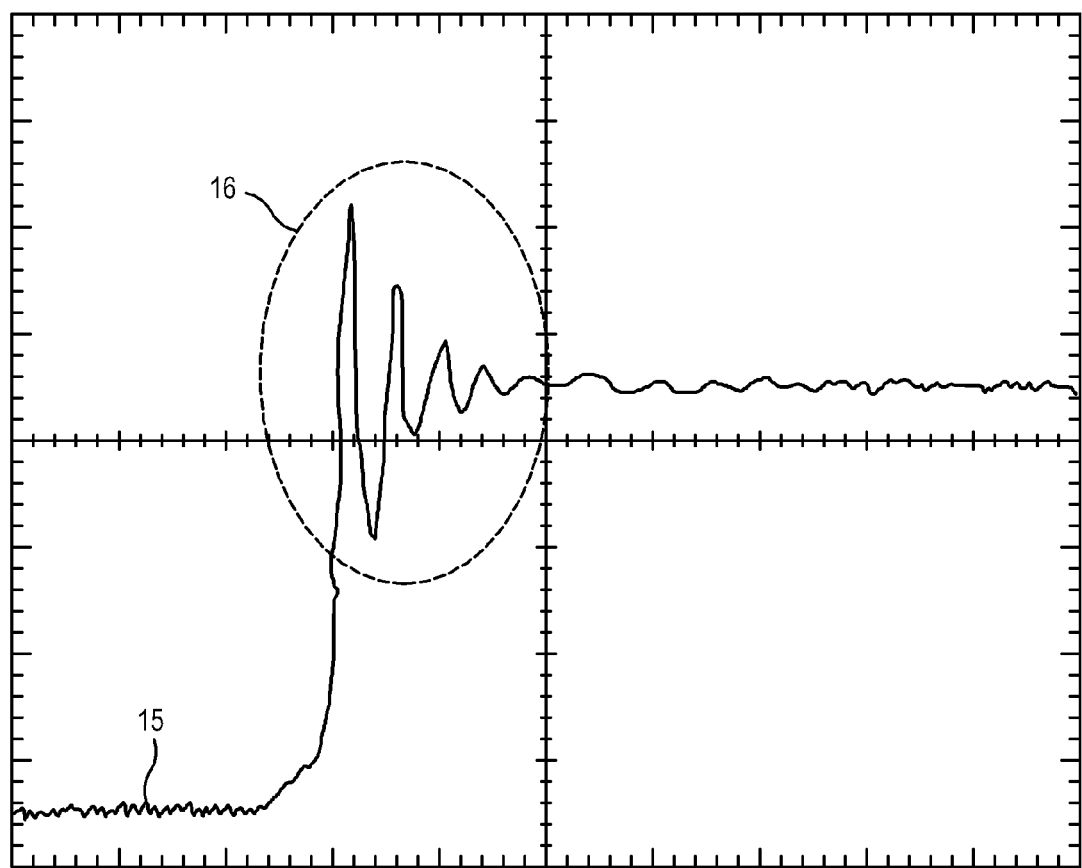
FIG. 9 illustrates a waveform of a phase voltage applied across a synchronous FET according to FIG. 8.

FIG. 9 is an example of a waveform 15 of the phase voltage $V_{PHASE}$ across the SFET according to FIG. 8. Compared to the amplitude of the high frequency noise at the rising edge 14 in FIG. 7, which was caused to increase by the frequency adjusting inductor L1, the amplitude of the high frequency noise at a rising edge 16 in FIG. 9 is decreased by the bootstrap resistor $R_D$.

For example, if the upper limit of the rated voltage of the SFET is 30V and the peak value of the phase voltage $V_{PHASE}$ is approximately 36V at the rising edge 14 in FIG. 7, the peak value of the phase voltage $V_{PHASE}$ exceeds the upper limit of the rated voltage of SFET. Accordingly, the resistant value of the bootstrap resistor $R_D$ is suitably determined (or set) so as to decrease the peak value of the phase voltage $V_{PHASE}$ at the rising edge 16 in FIG. 9, for example, down to 27V. Thus, the peak value of the phase voltage $V_{PHASE}$ does not exceed the upper limit of the rated voltage of the SFET.

Figure 10:
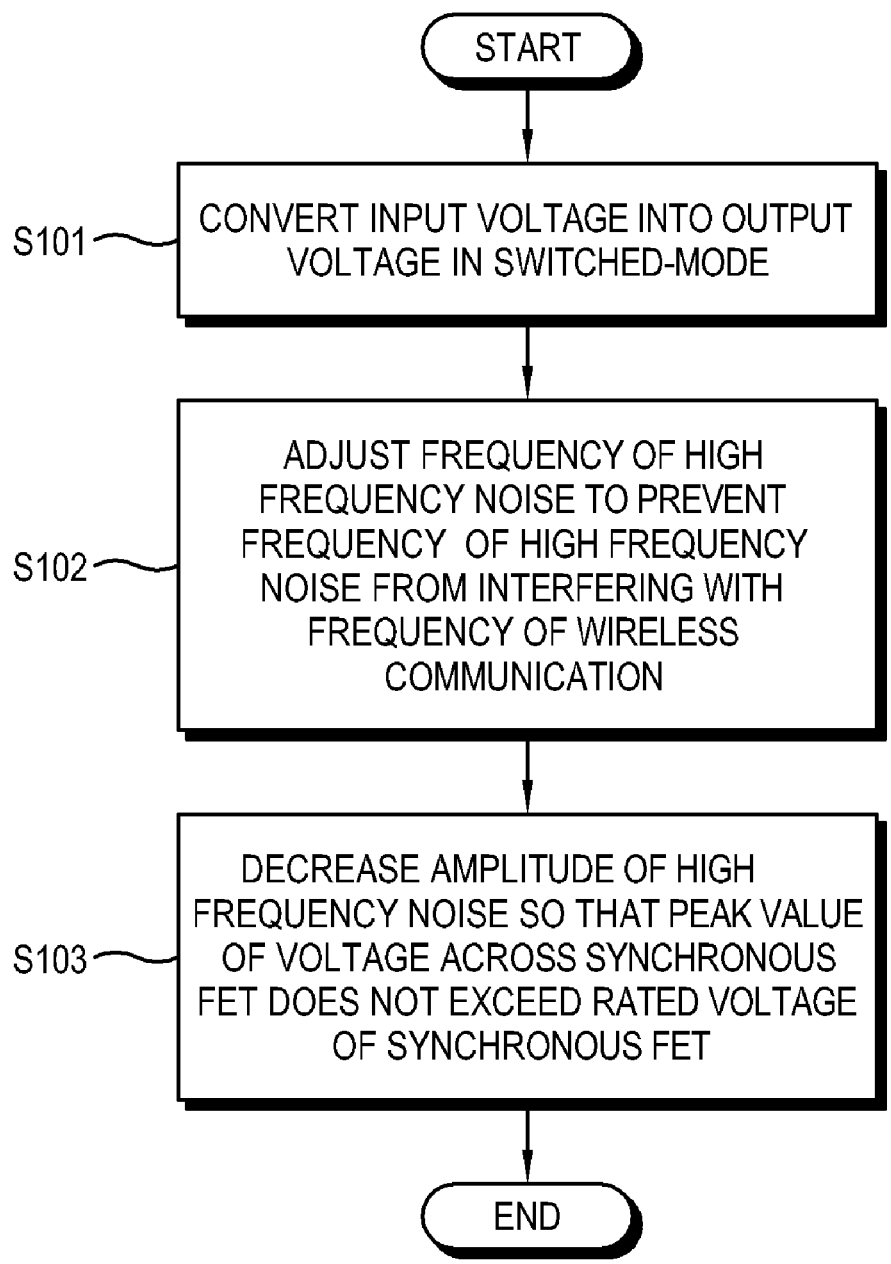
FIG. 10 is a flowchart of a power supplying method in a wireless communication apparatus according to an aspect of the present invention.

FIG. 10 is a flowchart of a power supplying method in a wireless communication apparatus according to an aspect of the present invention. As shown in FIG. 10, in operation S101, an input voltage is converted into an output voltage in a switched-mode so as to supply the output voltage to the wireless communication apparatus. At operation S102, a frequency of a high frequency noise caused by one or more parasitic components during the switching operation for the voltage conversion is adjusted to prevent the frequency of the high frequency noise from interfering with a frequency for wireless communication performed by the wireless communication apparatus.

In operation S102, frequency of the high frequency noise may be adjusted lower. Here, the frequency of the high frequency noise may be decreased by an inductor provided between an input terminal of the input voltage and a drain of a control field-effect transistor (CFET), which is one of a pair of FETs of a converter. For example, the inductor may be the frequency adjusting inductor L1 of the synchronous buck converter 10 (or 10a) shown in FIGS. 5 and 8, so that the inductance of the synchronous buck converter 10 (or 10a) may increase, to thereby decrease the frequency of the high frequency noise. In this case, the inductance of the frequency adjusting inductor L1 may be determined by (or be based on) the frequency of the high frequency noise. The inductance of the frequency adjusting inductor L1 may be obtained by the aforementioned formula 1 so as to not interfere with the frequency for the wireless communication.

In addition, in operation S103, the power supplying method of the wireless communication apparatus according to this aspect may further include an operation of decreasing an amplitude of the high frequency noise so that a peak value of a voltage across the synchronous field-effect transistor (SFET) does not exceed a rated voltage of the synchronous FET.

In operation S103, the amplitude of the high frequency noise may be decreased by a bootstrap resistor connected to an operating power input terminal of a driver to drive the CFET. For example, the bootstrap resistor may be the bootstrap resistor $R_D$ of the synchronous buck converter 10 (or 10a) shown in FIGS. 5 and 8. The bootstrap resistor $R_D$ causes an RC resonance together with a capacitance component of the CFET in a powering mode, to thereby result in decreasing the amplitude of the high frequency noise. The resistance of the bootstrap resistor $R_D$ may be determined by the aforementioned formula 2.

In the foregoing aspects, the high frequency noise caused at the rising edge of the phase voltage $V_{PHASE}$ across the SFET is described. Alternatively, aspects of the present invention may be applicable to a high frequency noise caused at a falling edge of the phase voltage $V_{PHASE}$.

As described above, aspects of the present invention provide a power apparatus and a wireless communication apparatus having the same to provide power to a wireless communication apparatus in a switched-mode, which avoid an interference between a frequency of a high frequency noise caused by parasitic components and a frequency of wireless communication by increasing an inductance of the parasitic components and improving reception sensitivity of the wireless communication.

Also, aspects of the present invention provide a power apparatus and a wireless communication apparatus having the same, which increase a damping factor to decrease the amplitude of a high frequency noise due to parasitic components and prevent or reduce a switching element from being damaged by an excessive high frequency noise.

Although a few aspects of the present invention have been shown and described, it would be appreciated by those skilled in the art that changes may be made in aspects without departing from the principles and spirit of the invention, the scope of which is defined in the claims and their equivalents.

What is claimed is:

1. A wireless communication apparatus, comprising:
   a wireless communication unit which performs wireless communication;
   a converter which converts an input voltage into an output voltage in a switched-mode to supply the output voltage to the wireless communication unit; and
   a frequency adjusting unit which adjusts a frequency of a high frequency noise caused by a parasitic component of the converter, if the converter is switched, to prevent the frequency of the high frequency noise from interfering with a frequency of the wireless communication performed by the wireless communication unit,
   wherein the frequency adjusting unit comprises an inductor that is provided between an input terminal providing the input voltage and a drain of a control Field Effect Transistor (FET) of a pair of FETs connected to the input terminal.

2. The wireless communication apparatus according to claim 1, wherein the inductor has an inductance set to prevent and/or reduce the interference between the frequency of the high frequency noise and the frequency of the wireless communication.

3. The wireless communication apparatus according to claim 2, wherein the pair of FETs are alternately turned on and off according to a control signal.

4. The wireless communication apparatus according to claim 3, wherein the inductance of the inductor is determined by a following [Formula 1]:

$$fc = \frac{1}{2\pi\sqrt{(L_{STRAY1} + L1)C_{OSS1}}} \qquad \text{[Formula 1]}$$

where, fc is the frequency of the high frequency noise caused by the parasitic component of the converter, L1 is the inductance of the inductor, $L_{STRAY1}$ is a parasitic inductance between the input terminal of the input voltage and the drain of the control FET, and $C_{OSS1}$ is an equivalent capacitance of a synchronous FET of the pair of FETs.

5. The wireless communication apparatus according to claim 3, further comprising an amplitude limiter which has a damping factor to decrease an amplitude of the high frequency noise caused by the parasitic component of the converter.

6. The wireless communication apparatus according to claim 5, wherein the damping factor is set so that a peak value of a voltage across a synchronous FET of the pair of FETs, does not exceed a rated voltage of the synchronous FET.

7. The wireless communication apparatus according to claim 5, wherein the amplitude limiter comprises a bootstrap resistor which has a resistance value corresponding to the damping factor.

8. The wireless communication apparatus according to claim 7, wherein the converter further comprises a driver which drives the control FET according to the control signal, and
   the bootstrap resistor is connected with an operating power input terminal of the driver.

9. The wireless communication apparatus according to claim 8, wherein the resistance value of the bootstrap resistor is determined by a following [Formula 2]:

Time constant=the resistance value of the bootstrap resistor*capacitance between a gate and a source of the control FET,   [Formula 2]

where, the time constant is a damping factor in a transient response of a voltage across a synchronous FET of the pair of FETs.

10. A power apparatus of a wireless communication apparatus which performs wireless communication, the power apparatus comprising:
   a converter which converts an input voltage into an output voltage in a switched-mode to supply the output voltage to the wireless communication apparatus; and
   a frequency adjusting unit which adjusts a frequency of a high frequency noise caused by a parasitic component of the converter, if the converter is switched, to prevent and/or reduce the frequency of the high frequency noise from interfering with a frequency of the wireless communication performed by the wireless communication apparatus,
   wherein the frequency adjusting unit comprises an inductor that is provided between an input terminal providing the input voltage and a drain of a control Field Effect Transistor (FET) of a pair of FETs connected to the input terminal.

11. A method for supplying power to a wireless communication apparatus which performs wireless communication, the method comprising:
   converting an input voltage into an output voltage in a switched-mode to supply the output voltage to the wireless communication apparatus; and
   adjusting a frequency of a high frequency noise caused by a parasitic component in the switched-mode of the converting to prevent and/or reduce the frequency of the high frequency noise from interfering with a frequency of the wireless communication performed by the wireless communication apparatus, wherein the frequency of the high frequency noise is adjusted by providing an inductor between an input terminal of the input voltage and a drain of a control Field Effect Transistor (FET) of a pair of FETs of a converter.

12. The method according to claim 11, wherein the adjusting comprises decreasing the frequency of the high frequency noise.

13. The method according to claim 12, wherein the frequency of the high frequency noise is decreased by providing the inductor between the input terminal of the input voltage and the drain of the control FET of the pair of FETs of a converter.

14. The method according to claim 13, wherein inductance of the inductor is determined by the following Formula 1:

$$fc = \frac{1}{2\pi\sqrt{(L_{STRAY1} + L1)C_{OSS1}}}$$ [Formula 1]

where, fc is the frequency of the high frequency noise, L1 is the inductance of the inductor, $L_{STRAY1}$ is a parasitic inductance between the input terminal of the input voltage and the drain of the control FET, and $C_{OSS1}$ is equivalent capacitance of a synchronous FET of the pair of FETs.

15. The method according to claim 11, further comprising decreasing an amplitude of the high frequency noise so that a peak value of a voltage across a synchronous FET of a pair of FETs of a converter which performs the converting of the input voltage does not exceed a rated voltage of the synchronous FET.

16. The method according to claim 15, wherein the frequency of the high frequency noise is decreased by providing a bootstrap resistor which is connected with an operating power input terminal of a driver which drives a control FET of the pair of FETs connected to the input terminal.

17. The method according to claim 16, wherein the resistance of the bootstrap resistor is determined by the following Formula 2:

Time constant=the resistance value of the bootstrap resistor*capacitance between a gate and a source of the control FET, [Formula 2]

wherein, the time constant is a damping factor in a transient response of a voltage across the synchronous FET.

18. A power supply apparatus of a wireless communication device, comprising:

a power converter to convert an input voltage into an output voltage, the power converter including,
  a first transistor and a second transistor, which are alternatively switched on and off with respect to each other, and
  an inductor positioned between an input terminal for the input voltage and the first resistor to reduce a frequency of a noise of the power converter that interferes with a frequency of a signal of the wireless communication device; and
a signal supplier to provide a pulse width modulation control signal to the first and second transistors to alternatively switch the first and second transistors.

19. The power apparatus according to claim 18, wherein the first transistor is a control field-effect transistor including a source, drain, and a gate, and the inductor is connected to the source of the first transistor.

20. The power apparatus according to claim 18, wherein the signal supplier comprises:
  a first driver to control the first transistor, the first driver including an operating power input terminal;
  a second driver to control the second transistor; and
  a resistor positioned between a terminal to supply power to the signal supplier and the operating power input terminal to decrease an amplitude of the noise of the power converter.

21. A method of supplying power to a wireless communication apparatus, comprising:
  converting an input voltage into an output voltage by alternatively switching a first transistor and a second transistor of a power converter to supply the output voltage to the wireless communication apparatus; and
  increasing an inductance of first parasitic components existing between an input terminal of the input voltage and the first transistor and/or second parasitic components existing between the second transistor and a ground to reduce a frequency of a noise having the frequency and an amplitude created by the first and/or the second parasitic components during switching of the first and second transistors.

22. The method according to claim 21, further comprising decreasing the amplitude of the noise by introducing a damping factor into the power converter.

* * * * *